United States Patent
Takahashi

(10) Patent No.: US 10,298,084 B2
(45) Date of Patent: May 21, 2019

(54) ROTATING ELECTRIC MACHINE FOR VEHICLE

(71) Applicant: DENSO CORPORATION, Kariya, Aichi-pref. (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 188 days.

(21) Appl. No.: 14/881,659

(22) Filed: Oct. 13, 2015

(65) Prior Publication Data
US 2016/0105065 A1    Apr. 14, 2016

(30) Foreign Application Priority Data
Oct. 14, 2014   (JP) ................. 2014-210209

(51) Int. Cl.
*H02K 3/42* (2006.01)
*H02K 1/24* (2006.01)

(52) U.S. Cl.
CPC ............... *H02K 3/42* (2013.01); *H02K 1/243* (2013.01)

(58) Field of Classification Search
CPC .. H02K 3/42; H02K 3/12; H02K 3/28; H02K 3/38; H02K 7/116; H02K 1/243
USPC ......... 310/257, 263, 156.66, 156.69, 156.71, 310/156.73
See application file for complete search history.

(56) References Cited

U.S. PATENT DOCUMENTS

| | | | |
|---|---|---|---|
| 5,936,326 A | 8/1999 | Umeda et al. | |
| 5,952,749 A | 9/1999 | Umeda et al. | |
| 5,955,810 A | 9/1999 | Umeda et al. | |
| 5,965,965 A | 10/1999 | Umeda et al. | |
| 5,982,068 A | 11/1999 | Umeda et al. | |
| 5,986,375 A | 11/1999 | Umeda et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,020,669 A | 2/2000 | Umeda et al. | |
| 6,051,906 A | 4/2000 | Umeda et al. | |
| 6,091,169 A | 7/2000 | Umeda et al. | |
| 6,097,130 A | 8/2000 | Umeda et al. | |
| 6,124,660 A | 9/2000 | Umeda et al. | |
| 6,137,201 A | 10/2000 | Umeda et al. | |
| 6,144,136 A | 11/2000 | Umeda et al. | |
| 6,181,043 B1 | 1/2001 | Kusase et al. | |
| 6,181,045 B1 | 1/2001 | Umeda et al. | |

(Continued)

FOREIGN PATENT DOCUMENTS

| | | |
|---|---|---|
| JP | H11-164499 A | 6/1999 |
| JP | 2002-218688 A | 8/2002 |
| JP | 2006-254599 A | 9/2006 |

*Primary Examiner* — Naishadh N Desai
(74) *Attorney, Agent, or Firm* — Oliff PLC

(57) ABSTRACT

A rotating electric machine including a stator including a stator core and a stator coil wound around the stator core, and a rotor including a rotor core arranged coaxially and radially in a face-to-face relationship with the stator core and a field coil wound around the rotor core. Both axial end portions of the rotor core project more axially outward than respective axial end faces of the stator core. The rotor core has a cutout surface between one of the axial end faces of the rotor core and an outer peripheral surface of the rotor core. A corner at which the cutout surface and the outer peripheral surface intersect is not more axially outward than either of the axial end faces of the stator core.

9 Claims, 9 Drawing Sheets

(56) References Cited

U.S. PATENT DOCUMENTS

| | | | |
|---|---|---|---|
| 6,198,190 B1 | 3/2001 | Umeda et al. | |
| 6,291,918 B1 | 9/2001 | Umeda et al. | |
| 6,459,177 B1 | 10/2002 | Nakamura et al. | |
| 6,459,186 B1 | 10/2002 | Umeda et al. | |
| 6,476,535 B1* | 11/2002 | Oohashi | H02K 1/243 310/263 |
| 2002/0047487 A1* | 4/2002 | Ikeda | H02K 1/243 310/263 |
| 2002/0096963 A1 | 7/2002 | Masegi | |
| 2006/0202582 A1* | 9/2006 | Umesaki | B60K 6/26 310/162 |
| 2007/0236098 A1* | 10/2007 | Kusase | H02K 9/06 310/263 |
| 2008/0136272 A1* | 6/2008 | Ishikawa | H02K 1/145 310/58 |
| 2009/0001843 A1* | 1/2009 | Enomoto | H02K 1/145 310/257 |
| 2009/0102314 A1* | 4/2009 | Miyata | H02K 1/243 310/257 |
| 2013/0134820 A1* | 5/2013 | Zhu | H02K 1/2713 310/156.64 |
| 2015/0229181 A1* | 8/2015 | Tanaka | H02K 1/243 310/51 |

* cited by examiner ic machine in accordance with the first embodiment of the present invention;

ROTATING ELECTRIC MACHINE FOR VEHICLE

CROSS-REFERENCE TO RELATED APPLICATION

This application is based on and claims the benefit of priority from earlier Japanese Patent Application No. 2014-210209 filed Oct. 14, 2014, the descriptions of which are incorporated herein by reference.

BACKGROUND

Technical Field

The present invention relates to a rotating electric machine mounted in a vehicle or the like and used as an electrical motor or a generator.

Related Art

A known rotating electric machine mounted in a vehicle, such as a vehicle alternator disclosed in Japanese Patent Application Laid-Open Publication No. 1999-164499, includes a stator and a rotor. The rotor includes a field coil and a Lundell core formed of a cylindrical portion, a yoke portion on an outer circumference of the cylindrical portion and a claw-shaped magnetic pole portion shaped so as to surround the field coil.

Another known rotating electric machine is a rotating field type synchronous motor as disclosed in Japanese Patent Application Laid-Open Publication No. 2006-254599 having permanent magnets imbedded in a rotor (referred to as an interior permanent magnet (IPM) motor).

The above rotating electric machines may utilize, as a coil wire, a rectangular wire having a rectangular cross-section matched in shape to slots of a stator core to increase a space factor of a stator coil wound in the slots of the stator core. Since such a rectangular wire commonly has a large cross-sectional area, eddy current generated in the coil wire may become problematic.

In some of motors including the Lundell core as disclosed in Japanese Patent Application Laid-Open Publication No. 1999-164499, the Lundell core is greater in axial length than the stator core. Also in some of IPM motors, the rotor core is greater in axial length than the stator core to increase the amount of flux. The rotor cores of these motors are prone to flux leakage flowing from the rotor core into coil ends of the stator coil exposed from the stator core. The coil ends are susceptible to large magnetic flux variations, which may cause large eddy-current losses, which may in turn cause heat generation.

In consideration of the foregoing, exemplary embodiments of the present invention are directed to providing a rotating electric machine capable of reducing flux leakage flowing from a rotor core toward coil ends of a stator coil, thereby reducing eddy-current losses in the coil ends.

SUMMARY

In accordance with an exemplary embodiment of the present invention, there is provided a rotating electric machine including: a stator including a stator core and a stator coil wound around the stator core; a rotor including a rotor core arranged coaxially and radially in a face-to-face relationship with the stator core and a field coil wound around the rotor core, both axial end portions of the rotor core projecting more axially outward than respective axial end faces of the stator core. The rotor core has a cutout surface between one of the axial end faces of the rotor core and an outer peripheral surface of the rotor core. A corner at which the cutout surface and the outer peripheral surface intersect is not more axially outward than either of the axial end faces of the stator core.

In the above embodiment, the rotor core has a cutout surface between one of the axial end faces of the rotor core and the outer peripheral surface of the rotor core, and the corner at which the cutout surface and the outer peripheral surface intersect is not more axially outward than either of the axial end faces of the stator core. This allows the magnetic flux flowing from the rotor core toward the stator to be concentrated into the stator core, whereby the flux leakage flowing into the coil ends of the stator coil is reduced, which can reliably curtail eddy-current losses.

DESCRIPTION OF SPECIFIC EMBODIMENTS

Example embodiments will now be described more fully with reference to the accompanying drawings. Example embodiments are provided so that this disclosure will be thorough, and will fully convey the scope to those who are skilled in the art. Numerous specific details are set forth such as examples of specific components to provide a thorough understanding of embodiments of the present disclosure. It will be apparent to those skilled in the art that example embodiments may be embodied in many different forms and that neither should be construed to limit the scope of the disclosure.

First Embodiment

Figure 1:
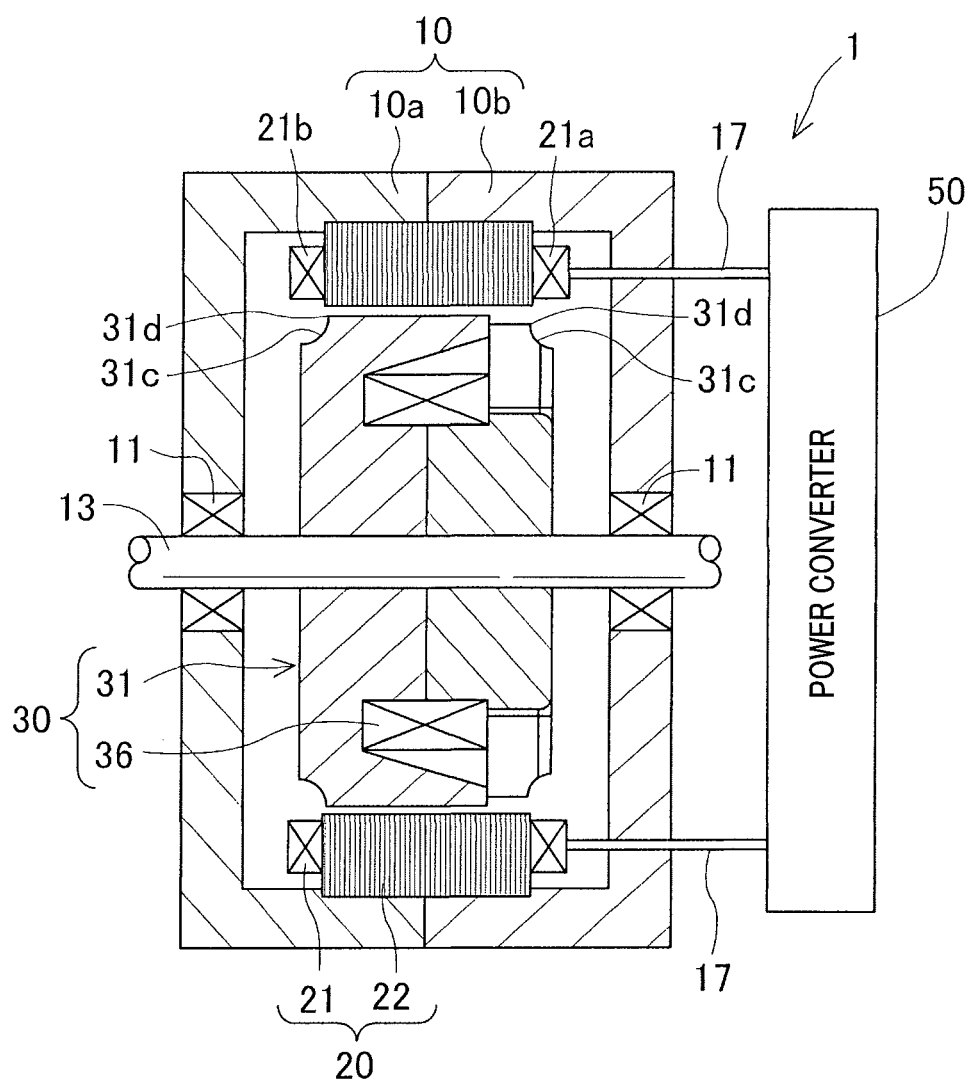
FIG. 1 is an axial cross-sectional view of a rotating electric machine in accordance with a first embodiment of the present invention.

A rotating electric machine 1 in accordance with a first embodiment of the present invention is a vehicle electric motor-generator. As shown in FIG. 1, the rotating electric machine 1 includes a housing 10, a stator 20 including a stator core 22 and a stator coil 21 and operable as an armature, a rotor 30 including a Lundell rotor core 31 and a field coil 36 and operable as a field, and a power converter 50. The power converter 50 is electrically connected to the stator coil 21 and input-output lines 17 and others. The housing 10 is formed into a substantially cylindrical shape by joining openings of a pair of housing members 10a and 10b both shaped like a closed-end cylinder, opening to opening.

Figure 2:
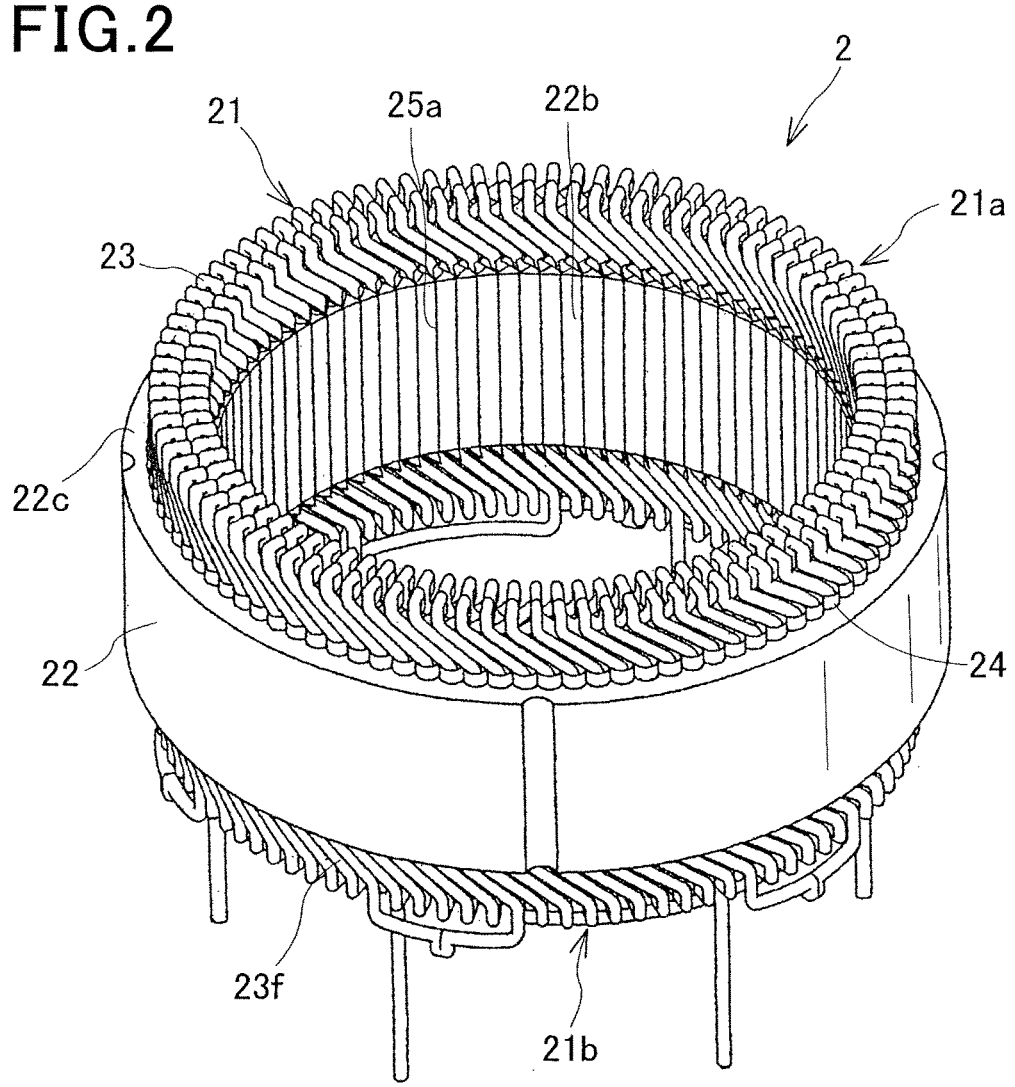
FIG. 2 is an overall perspective view of a stator in accordance with the first embodiment.

The stator 20, as shown in FIG. 2, includes an annular stator core 22 having a plurality of slots 25 circumferentially arranged in the stator core, a segmented stator coil 21 formed of a plurality of conductor segments 23, and an insulating sheet member 24 for electrically isolating the stator coil 21 from the stator core 22. The stator 20 is sandwiched and secured between the pair of housing members 10a and 10b.

The stator core 22 is an axial stack of annular magnetic steel plates. The stator core 22 includes an annular back core 22a that is an outer periphery portion of the stator core 22, and a plurality of teeth 22b that project inward in a radial direction of the stator core 22 from the back core 22a and are equally circumferentially spaced a predetermined distance apart from each other. The teeth 22b and the slots 25 axially through the stator core 22 are alternately arranged in the circumferential direction of the stator core 22 so as to receive the multi-phase stator coils 21 in the slots 25. In the present embodiment, as an example, the rotor 30 has sixteen magnetic poles. Therefore, ninety-six slots 25 are equally circumferentially spaced from each other so as to receive two three-phase stator coils 21 in the slots 25.

Figure 3:
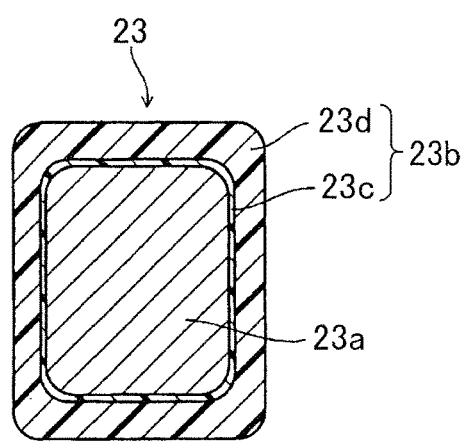
FIG. 3 is a cross-sectional view of a conductor segment used in the first embodiment.
Figure 4:
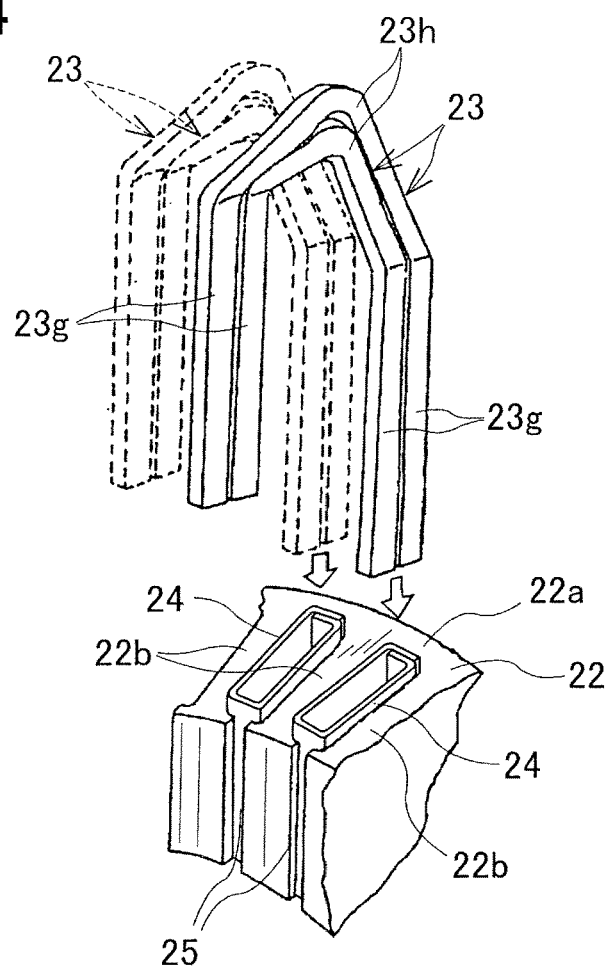
FIG. 4 is a schematic of insertion of the conductor segment into slots of a stator core.

The stator coils 21 received in the slots 25 of the stator core 22 are formed of a plurality of U-shaped conductor segments 23 joined at their junction end portions (see FIG. 4). Each conductor segment 23, as shown in FIG. 3, is a rectangular wire with a rectangular cross section including a conductor 23a formed of a conductive metal material, such as copper, aluminum or the like, and a bilayer insulative coating 23b formed of inner and outer layers 23c, 23d and covering a peripheral surface of the conductor 23a.

Referring to FIG. 4, each conductor segment 23 is U-shaped and includes a pair of straight portions 23g, 23g, and a turn portion 23h connecting the straight portions 23g, 23g at their respective ends. The pair of straight portions 23g, 23g of the conductor segment 23 are inserted into two slots 25 spaced a predetermined slot pitch apart from each other from one axial end of the stator core 22. Thereafter, open end portions of a pair of straight portions 23g, 23g of each conductor segment 23 extending axially outside the stator core 22 on the other axial end side of the stator core 22 from the two slots 25 are bent toward circumferentially opposite directions to provide bent portions 23f having a length of one-half pole pitch and inclined at a determined angle to the other end face of the stator core 22 (see FIG. 2).

On the other axial end side of the stator core 22, ends of the prescribed bent portions 23f of different conductor segments 23 are welded to each other in accordance with a predetermined electrical connection pattern. Thus, the prescribed conductor segments 23 are electrically connected in series, whereby the stator coil 21 including three phase (U-phase, V-phase, and W-phase) windings wound circumferentially along the slots of the stator core 22 is formed. Axially outward projecting coil ends 21a, 21b from respective axial end faces 22c of the stator core 22 are formed at both axial ends of the stator coil 21.

For each of the multi-phase windings of the stator coil 21, the number of coil turns around the stator core 22 is four. The stator winding 21 further includes, for each phase, deformed conductor segments (not shown, but different in shape from the basic segments) including a conductor segment integrated with a lead out from an output, a conductor segment integrated with a lead out from a neutral point, and a conductor segment having a turn portion that provides connection between the first and second turn portions. Such deformed conductor segments allow winding ends of the respective multi-phase windings to be star connected.

The rotor 30 is rotatably supported by the housing 10 via the bearings 11 at both axial ends of the rotor 30 to rotate in unison with the shaft 13. In the housing 10, the rotor 30 and the stator core 22 are coaxially arranged and radially in a face-to-face relationship with a predetermined gap between them. The rotor 30 includes the Lundell rotor core 31 and the field coil 36 wound around the rotor core 31.

Figure 5:
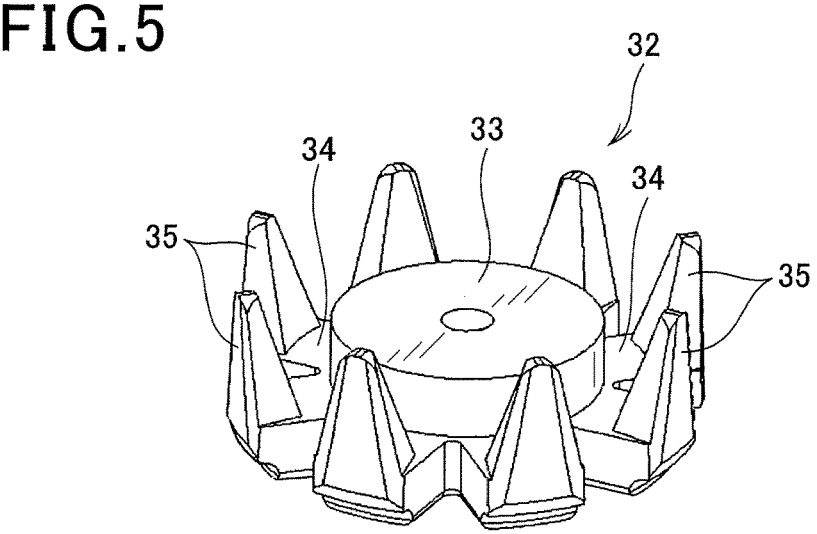
FIG. 5 is a perspective view of one of Lundell cores of a rotor in accordance with the first embodiment.
Figure 6:
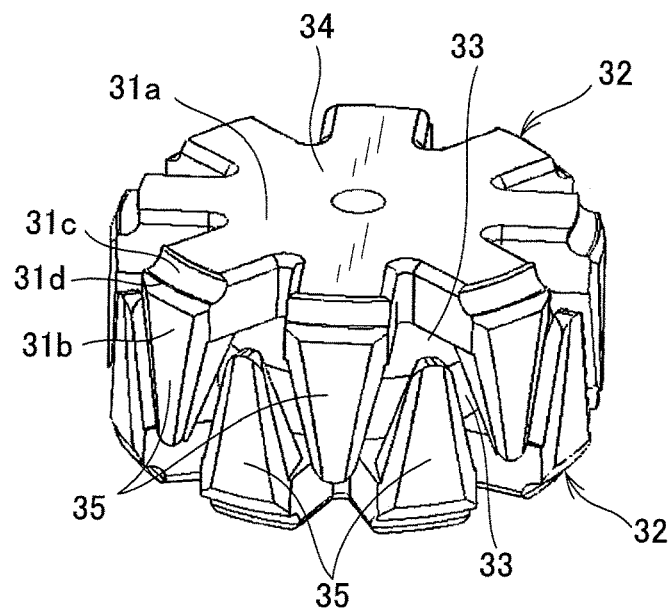
FIG. 6 is a perspective view of a pairwise combination of Lundell cores of the rotor in accordance with the first embodiment.

The Lundell rotor core 31, as shown in FIGS. 5 and 6, is a pairwise combination of front and rear pole cores 32. Each pole core 32 includes a cylindrical boss portion 33 surrounding and secured to the outer circumference of the shaft 13, a disc portion 34 radially extending from one axial end face of the boss portion 33, a plurality of (eight in the present embodiment) claw-shaped magnetic pole portions 35 extending axially on the boss portion 33 side of the disc portion 34 from the outer periphery of the disc portion 34. The claw-shaped magnetic pole portions 35 of the respective pole cores 32 face in alternate directions, as shown in FIG. 6. In the present embodiment, each pole core 32 has eight claw-shaped magnetic pole portions 35, thereby forming a sixteen-pole rotor core 31.

Figure 7:
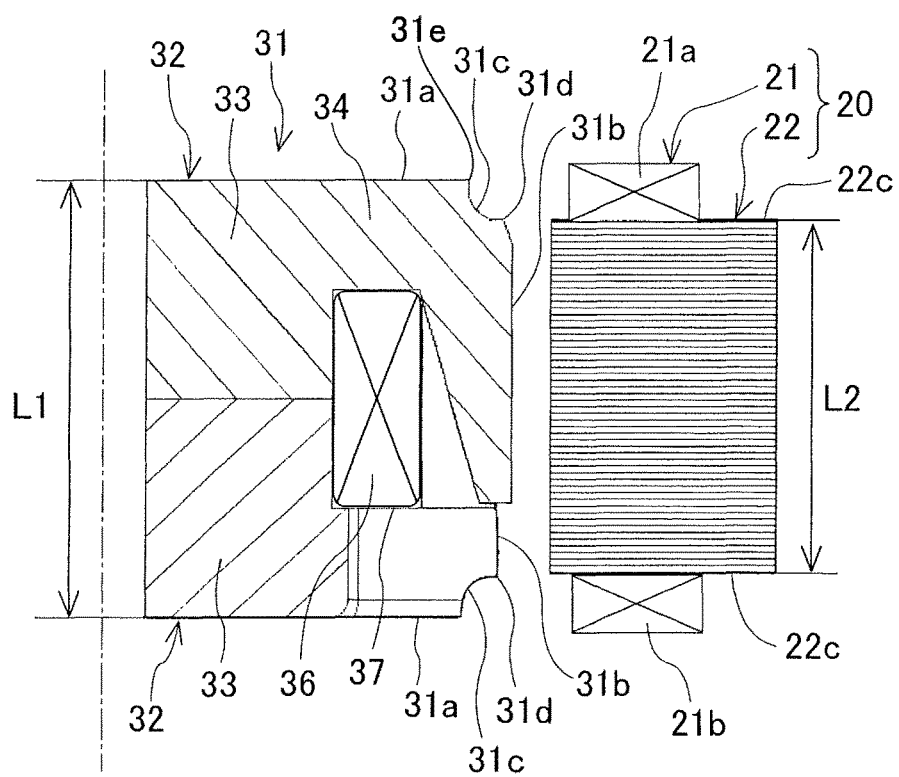
FIG. 7 is an axial sectional view of placement of the rotor and the stator in accordance with the first embodiment.

As shown in FIG. 7, an axial length L1 of the rotor core 31 is set greater than an axial length L2 of the stator core 22. Both axial end portions of the rotor core 31 project more axially outward than the respective axial end faces 22c of the stator core 22. Each pole core 32 has cutout surfaces 31c between the axial end face 31a of the disc portion 34 and outer peripheral surfaces 31b of the respective claw-shaped magnetic pole portions 35, where the cutout surfaces 31c extend circumferentially with a predetermined width. Each cutout surface 31c is a concave surface that is convex toward the center axis of the pole core 32 in axial cross-sectional profile so as to be curved in a circular arc.

For each cutout surface 31c, an intersection angle between the cutout surface 31c and the outer peripheral surface 31b increases so as to approach 90 degrees at a corner 31d between them. In addition, for each cutout surface 31c, an intersection angle between the cutout surface 31c and the axial end face 31a increases so as to approach 90 degrees at a corner 31e between them. With this configuration, as a point on the cutout surface 31c moves radially inwardly away from the corner 31d, a distance from the stator 20 to the point rapidly increases.

The rotor core 31 is configured such that each corner 31d at which one of the cutout surfaces 31c and one of the outer peripheral surfaces 31b intersect does not project more axially outward than the axial end face 22c of the stator core 22. In the present embodiment, the corner 31d and the axial end face 22c are configured to occupy a substantially same axial position. The rotor core 31 is further configured such that for each of the cutout surfaces 31c at both axial ends of the rotor core 31, a separation distance X between the cutout surface 31c and the root end of one of the coil ends 21a, 21b of the stator coil 21 is equal to or greater than a predetermined value. This allows the magnetic flux flowing from the rotor core 31 toward the stator 20 to be concentrated into the stator core 22, whereby the flux leakage flowing into the coil ends 21a, 21b is reduced.

The field coil 36 is a cylindrical and concentric winding of insulated copper wire disposed in a space between the boss portions 33 and the claw-shaped magnetic pole portions 35. The field coil 36 is in contact with inner diameter side surfaces of the claw-shaped magnetic pole portions 35 of the pole core 32 through insulating paper 37 under compression pressure. The insulating paper 37 is a sheet impregnated with resin and is heat treated to be secured while enclosing the field coil 36, which ensures electrical isolation between the pole core 32 and the field coil 36.

Figure 8:
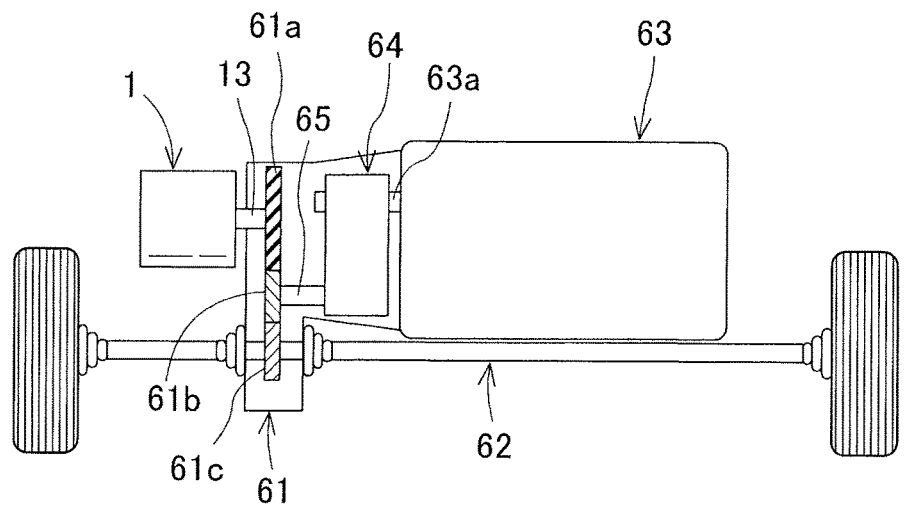
FIG. 8 is a schematic of the rotating electric machine mounted in a vehicle.

Upon mounting the rotating electric machine 1 of the present embodiment configured as above in a vehicle, the shaft 13 is connected to a wheel axis 62 via gears 61a-61c of a gearbox 61, as shown in FIG. 8. An input shaft 65 for the engine 63 connected to an output shaft 63a of the engine 63 via the transmission 64 is connected to the rotating electric machine 1 and the wheel axis 62 via the gears 61a-61c of the gearbox 61. A gear ratio between the shaft 13 for the rotating electric machine 1 and the input shaft 65 for the engine 63 is greater than one. In the present embodiment, the gear ratio between the shaft 13 and the input shaft 65 is set to 3/1.

Upon excitation of the stator 20 according to power-converted drive current supplied from the power converter 50, rotational torque (including drive torque) is generated to rotate the rotor 30. The rotating electric machine 1 is then operated as an electrical motor. The generated rotation torque is outputted from the rotor 30 and the shaft 13 to the wheel axis 62 via the gears 61a-61c of the gearbox 61.

When no power conversion signal is outputted form the power converter 50 and a rotational force of the shaft 63a generated by the operation of the engine 63 is transferred to the shaft 13 via the transmission 64, the input shaft 65 and the gears 61b, 61a, the rotor 30 also rotates, which causes a back electromotive force (EMF) to be generated in the stator coil 21 of the stator 20. The generated back EMF (regenerated electrical power) can be charged in a battery via the power converter 50. The rotating electric machine 1 is then operated as an alternator.

As above, in the rotating electric machine 1 of the present embodiment, the rotor core 31 includes the cutout surfaces 31c between the axial end face 31a and the respective outer peripheral surfaces 31b. The rotor core 31 is configured such that each corner 31d between the cutout surface 31c and the outer peripheral surface 31b (corresponding to the corner 31d) is not more axially outward than the axial end face 22c of the stator core 22. This allows the magnetic flux flowing from the rotor core 31 toward the stator 20 to be concentrated into the stator core 22, whereby the flux leakage flowing into the coil ends 21a, 21b is reduced. This can reliably curtail the eddy-current loss.

Particularly, in the present embodiment, the gear ratio between the shaft 13 for the rotating electric machine 1 and the input shaft 65 for the engine 63 is set to 3/1, which may cause the rotor 30 to rotate at high speed. When the rotor 30 rotates at high speed, a current frequency of the rotating electric machine 1 is increased, leading to an increased eddy-current loss. Therefore, the rotor core 31 is configured as above such that each corner 31d between the cutout surface 31c and the outer peripheral surface 31b (corresponding to the corner 31d) is not more axially outward than the axial end face 22c of the stator core 22, which can reliably and advantageously curtail the eddy-current loss.

In the present embodiment, each of the conductor segments 23 forming the stator coil 21 is a rectangular wire including a conductor 23a formed of an electrically conductive material and having a rectangular cross-section, and an insulative coating 23b coating the outer peripheral surface of the conductor 23a. Thus, the conductor segments 23 are shaped such that the space factor of the conductor segments 23 received in the slots 25 of the stator core can be maximized while being most susceptible to the eddy-current loss. Therefore, the present embodiment can be much effective in such a situation.

In the present embodiment, the separation distance X between the root end of each of the coil ends 21a, 21b of the stator coil 21 projecting more axially outward than the axial end face 22c of the stator core 22 and one of the cutout surfaces 31c of the rotor core 31 is equal to or greater than the separation distance X1 between the corner 31d between the one of the cutout surfaces 31c and the outer peripheral surface 31b and the coil end 21a, 21b. This allows the density of the flux leakage flowing from the rotor core 31 into the coil ends 21a, 21b to be comparable to the magnetic flux density in each of the slots 25, that is, as low as the magnetic flux density in each of the slots 25 in the magnetically shielded stator core 22. This effect can be confirmed by the results of this test conducted by the present inventors for the rotating electric machine 1 of the present embodiment (see FIG. 9).

Figure 9:
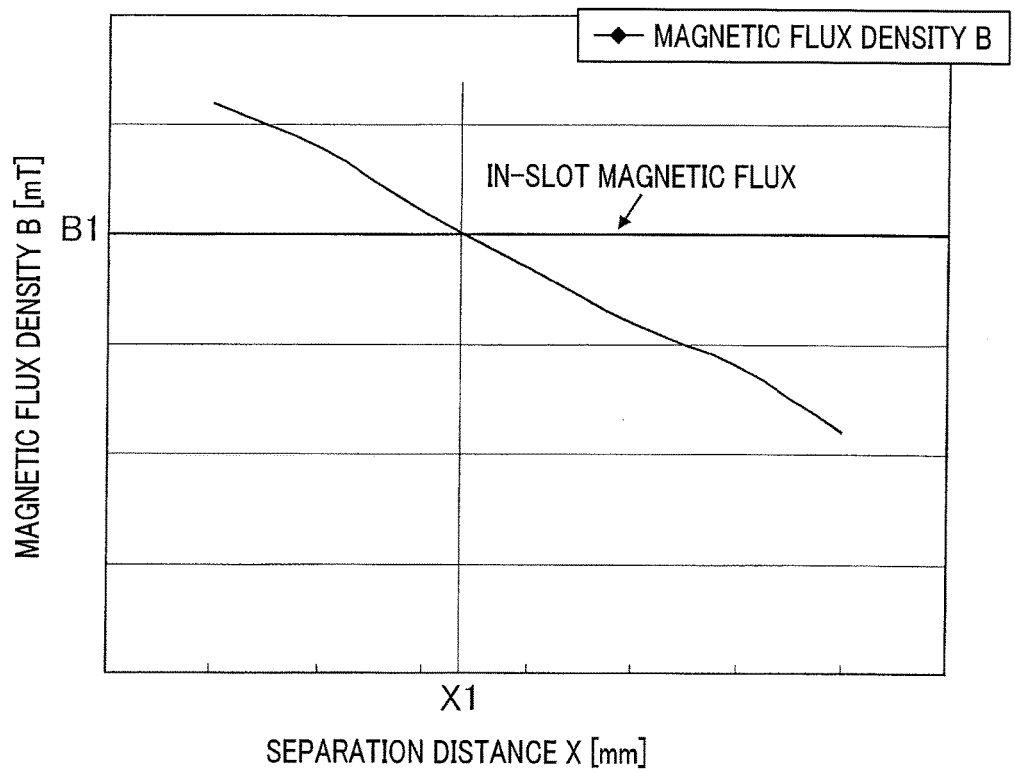
FIG. 9 is a graph illustrating a relationship between a separation distance X and a magnetic flux density B as measurement results of a test conducted for the rotating electric machine in accordance with the first embodiment.
Figure 10:
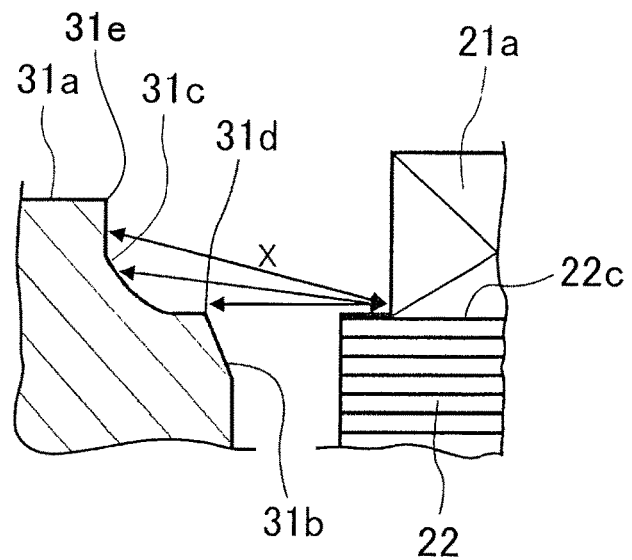
FIG. 10 is a schematic of locations where measurements are made in the test conducted for the rotating electric machine in accordance with the first embodiment.

In the test, as shown in FIG. 10, the separation distance X between the root end of the coil end 21a projecting more axially outward than the axial end face 22c of the stator core 22 and one of the cutout surfaces 31c of the rotor core 31 was altered to measure the magnetic flux density B1. FIG. 9 shows the measurement results.

As can be seen from FIG. 9, the magnetic flux density B1 at the minimum separation distance X that is the predetermined distance X1 between one of the corners 31d and one of the coil ends 21a, 21b is as low as the magnetic flux density in each of the slots 25 in the stator core 22. As the separation distance X is gradually decreased from X1, the magnetic flux density B1 gradually increases, where it can be observed that the flux leakage flowing from the rotor core 31 into the coil end 21a cannot be sufficiently shielded. In addition, as the separation distance X is gradually increased from X1, the magnetic flux density B1 gradually decreases. Therefore, it can be observed that setting the separation distance X to the predetermined distance X1 or greater allows the flux leakage flowing from the rotor core 31 into the coil ends 21a, 21b to be as low as the magnetic flux density in each of the slots 25.

Second Embodiment

A rotating electric machine in accordance with a second embodiment of the present invention will now be explained. The rotating electric machine of the second embodiment is similar in configuration to the rotating electric machine 1 of the first embodiment except in that cutout surfaces 31c of the second embodiment are different in shape from the cutout surfaces 31c of first embodiment. Only differences of the second embodiment from the first embodiment will be explained. Elements having the same functions or made of the same material as in the first embodiment are assigned the same numbers and will not be described again for brevity.

Figure 11:
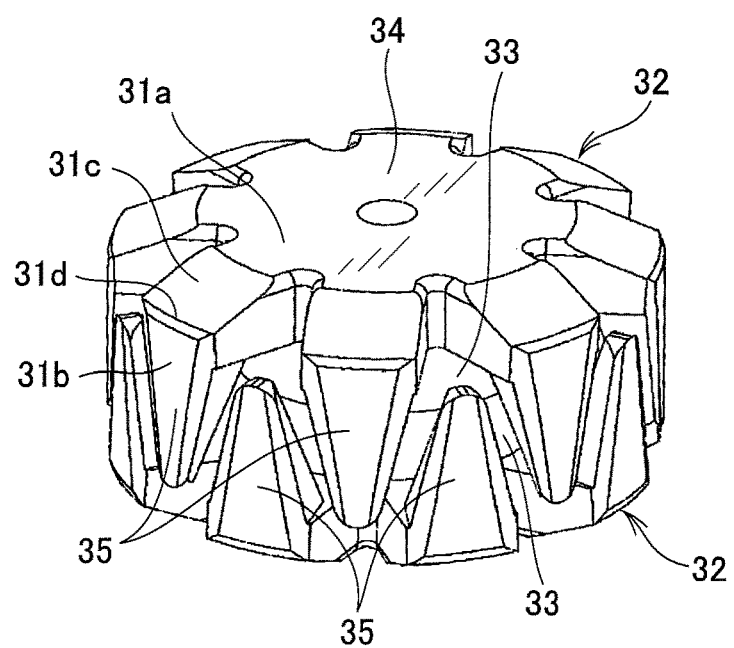
FIG. 11 is a perspective view of a pairwise combination of Lundell cores of a rotor in accordance with a second embodiment of the present invention.

The rotor core 31 of the second embodiment is the Lundell rotor core 31 that is similar to that of the first embodiment. As shown in FIG. 11, the Lundell rotor core 31 of the second embodiment is a pairwise combination of front and rear pole cores 32. Each pole core 32, as in the first embodiment, includes a boss portion 33, a disc portion 34, and eight claw-shaped magnetic pole portions 35. The claw-shaped magnetic pole portions 35 of the respective pole cores 32 face in alternate directions.

Figure 12:
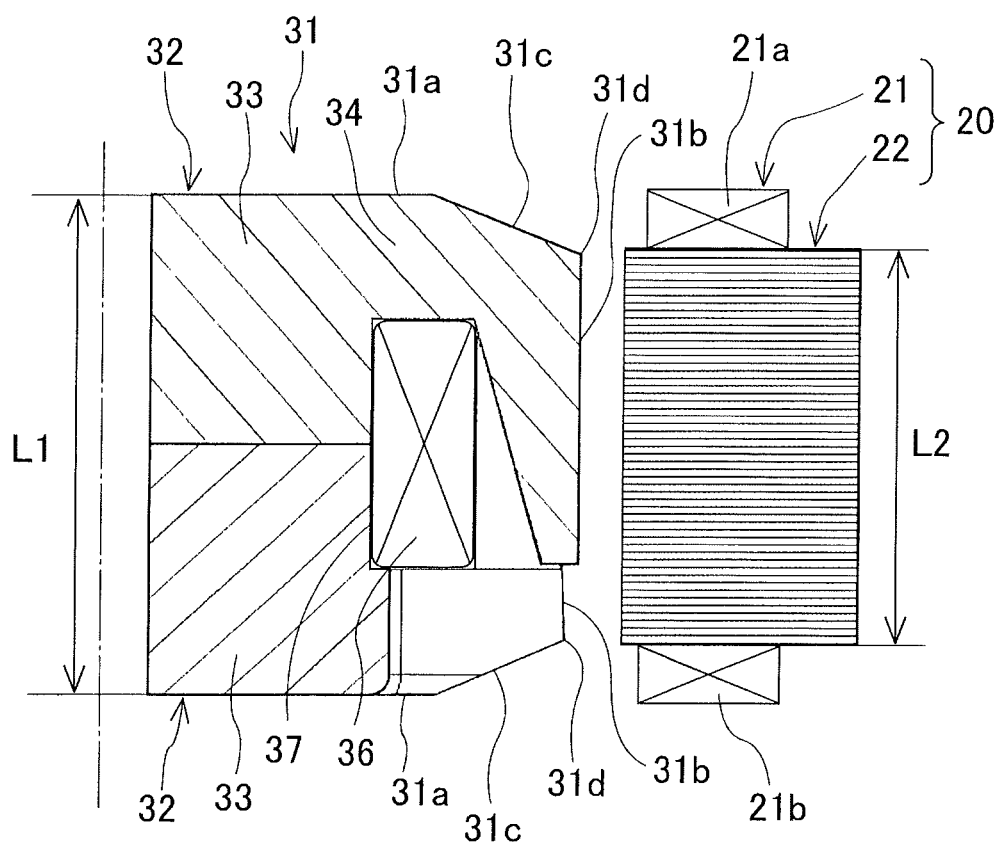
FIG. 12 is an axial sectional view of placement of the rotor and the stator in accordance with the second embodiment.

As shown in FIG. 12, an axial length L1 of the rotor core 31 is set greater than an axial length L2 of the stator core 22. Both axial end portions of the rotor core 31 project more axially outward than the respective axial end faces 22c of the stator core 22. Each pole core 32 has cutout surfaces 31c between the axial end face 31a of the disc portion 34 and outer peripheral surfaces 31b of the respective claw-shaped magnetic pole portions 35, where the cutout surfaces 31c extend circumferentially with a predetermined width. In the second embodiment each cutout surface 31c is a straight ramped surface that is linearly inclined relative to the center axis of the pole core 32 in axial cross-sectional profile while in the first embodiment each cutout surface 31c is a concave surface that is convex toward the center axis of the pole core 32 in axial cross-sectional profile so as to be curved in a circular arc.

The rotor core 31, as in the first embodiment, is configured such that each corner 31d at which one of the cutout surfaces 31c and one of the outer peripheral surfaces 31b intersect is not more axially outward than the axial end face 22c of the stator core 22. Also in the second embodiment, the corner 31d and the axial end face 22c are configured to occupy a substantially same axial position. The rotor core 31, as in the first embodiment, is further configured such that for each of the cutout surfaces 31c at both axial ends of the rotor core 31, a separation distance X between the cutout surface 31c and the root end of one of the coil ends 21a, 21b of the stator coil 21 is equal to or greater than the predetermined distance X1 between the corner 31d and the coil end 21a, 21b. This allows the magnetic flux flowing from the rotor core 31 toward the stator 20 to be concentrated into the stator core 22, whereby the flux leakage flowing into the coil ends 21a, 21b is reduced.

The rotating electric machine of the second embodiment configured as above can provide similar advantages to those of the first embodiment. Particularly, in the second embodiment, each cutout surface 31c of each pole core 32 is a straight ramped surface, which can facilitate formation of the cutout surfaces 31c.

Third Embodiment

A rotating electric machine 2 in accordance with a third embodiment of the present invention will now be explained. The rotating electric machine 2 of the second embodiment is similar in configuration to the rotating electric machine 1 of the first embodiment except in that the rotor core 31 is not of Lundell type but includes imbedded permanent magnets 39. Only differences of the third embodiment from the first embodiment will be explained. Elements having the same functions or made of the same material as in the first embodiment are assigned the same numbers and will not be described again for brevity.

Figure 13:
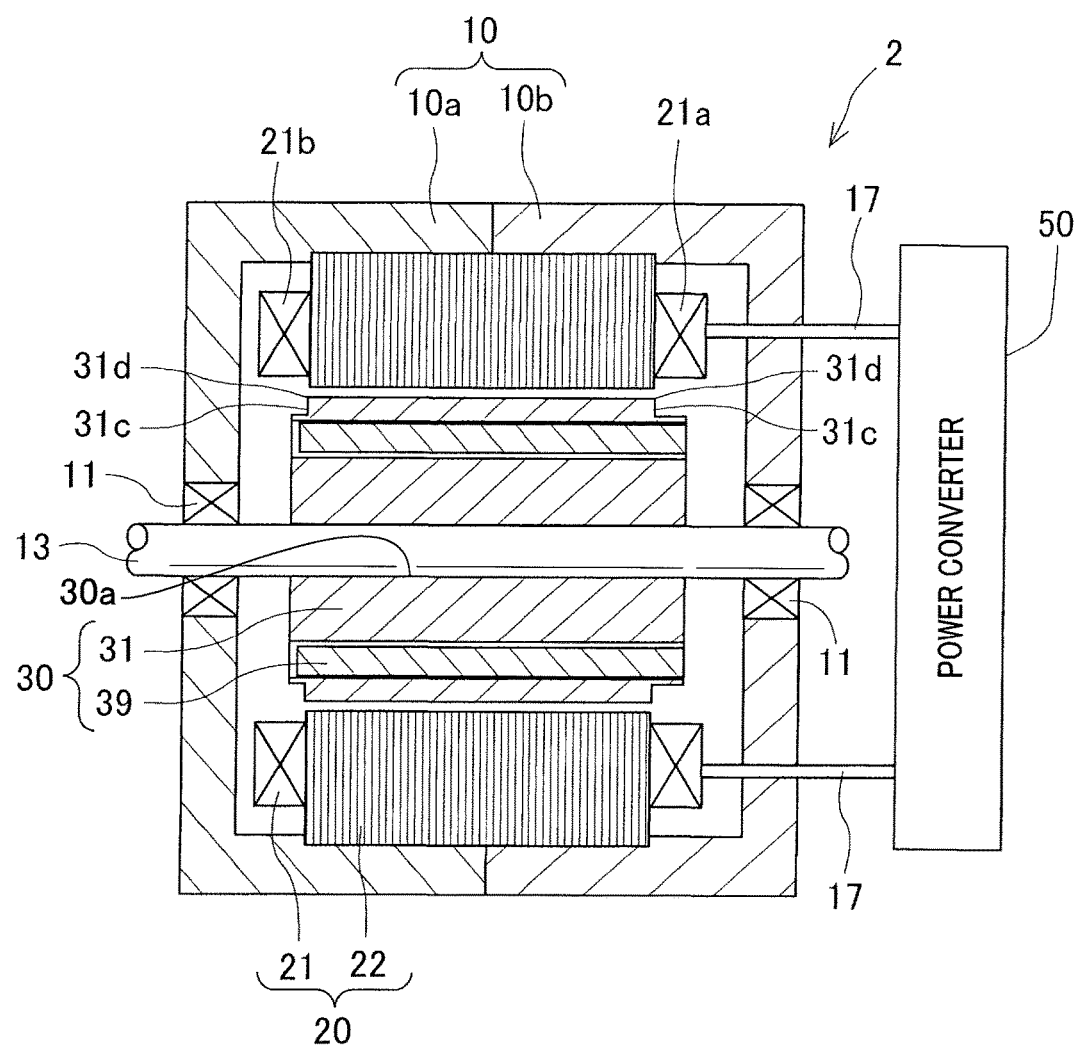
FIG. 13 is an axial cross-sectional view of a rotating electric machine in accordance with a third embodiment of the present invention.

The rotor 30 of the third embodiment, as shown in FIG. 13, is rotatably supported by the housing 10 via the bearings 11 at both axial ends of the rotor 30 to rotate in unison with the shaft 13. In the housing 10, the rotor 30 and the stator core 22 are coaxially arranged and radially in a face-to-face relationship with a predetermined gap between them. The rotor 30 has an axial bore 30a into which the rotary shaft 13 is press fit. The rotor 30 includes a rotor core 31 having a plurality of permanent magnet receiving holes 38 that are arranged circumferentially around the rotor core 31, and a plurality of permanent magnets 39 received in the respective permanent magnet receiving holes 38 and forming circumferentially alternating poles.

Figure 14:
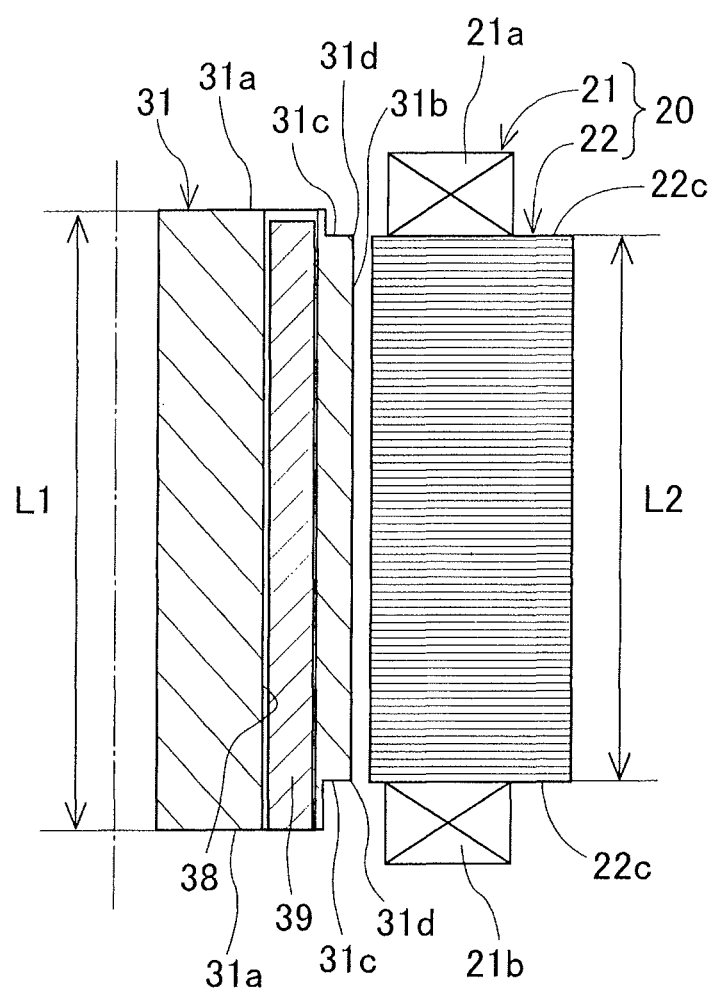
FIG. 14 is an axial sectional view of placement of the rotor and the stator in accordance with the third embodiment.

The rotor core 31 is an axial stack of annular magnetic steel plates having the axial bore 30a at its center into which the rotary shaft 13 is press fit. As shown in FIG. 14, the axial length L1 of the rotor core 31 is set greater than the axial length L2 of the stator core 22. Both axial end portions of the rotor core 31 project more axially outward than the respective axial end faces 22c of the stator core 22. The rotor core 31 has a cutout surface 31c between each axial end face 31a and the outer peripheral surface 31b of the rotor core 31, where the cutout surface 31c is L-shaped in axial cross-sectional profile and extends circumferentially around the rotor core 31 with a predetermined width.

For each cutout surface 31c, an outer peripheral surface 31b side planar portion of the cutout surface 31c extending circumferentially around the rotor core 31 intersects with outer peripheral surface 31b of the rotor core 31 at a 90 degree angle. With this configuration, as a point on the cutout surface 31c moves radially inwardly away from the corner 31d, a distance from the stator 20 to the point rapidly increases. An axial end face 31a side planar portion of the cutout surface 31c extending circumferentially around the rotor core 31 intersects with axial end face 31a of the rotor core 31 at a 90 degree angle.

The rotor core 31, as in the first embodiment, is configured such that each corner 31d at which the cutout surface 31c and the outer peripheral surface 31b intersect is not more axially outward than the axial end face 22c of the stator core 22. Also in the third embodiment, the corner 31d and the axial end face 22c are configured to occupy a substantially same axial position. The rotor core 31, as in the first embodiment, is further configured such that for each of the cutout surfaces 31c at both axial ends of the rotor core 31, a separation distance X between the cutout surface 31c and the root end of one of the coil ends 21a, 21b of the stator coil 21 is equal to or greater than 10.3 mm. This allows the magnetic flux flowing from the rotor core 31 toward the stator 20 to be concentrated into the stator core 22, whereby the flux leakage flowing into the coil ends 21a, 21b is reduced.

The rotating electric machine 2 of the third embodiment configured as above can provide similar advantages to those of the first embodiment. Particularly, in the third embodiment, the permanent magnets 39 are imbedded in the rotor core 31, which allows both the reluctance torque generated by magnetization of the rotor 30 and the torque generated by magnetization of the permanent magnets 39 to be utilized. This can lead to high efficiency.

In addition, each cutout surface 31c of the rotor core 31 is formed of two planar portions, that is, the outer peripheral surface 31b side planar portion and the axial end face 31a side planar portion, which can facilitate formation of the cutout surfaces 31c.

Other Embodiments

The foregoing disclosure and description of the invention is illustrative and explanatory thereof. Various changes in the details of the illustrated construction can be made within the scope of the appended claims without departing from the true spirit of the invention.

The axial cross-sectional profile or inclination angle of the cutout surfaces 31c of the rotor core 31, the axial length L1 of the rotor core 31 or the axial length L2 of the stator core 22, or others may be appropriately changed according to the specifications of the rotating electric machine.

In the first to third embodiments, the rotating electric machine of the present invention was shown as being applied to the vehicle electric motor-generator. Alternatively, the rotating electric machine of the present invention may be applied to, as the rotating electric machine, either an alternator or an electrical motor mounted in a vehicle.

What is claimed is:

1. A rotating electric machine comprising:
   a stator including a stator core and a stator coil wound around the stator core; and
   a rotor including a rotor core arranged coaxially and radially in a face-to-face relationship with the stator core and a field coil wound around the rotor core, both axial end portions of the rotor core projecting more axially outward than respective axial end faces of the stator core,
   wherein the rotor core has a cutout surface between one of axial end faces of the rotor core and an outer peripheral surface of the rotor core, an intersection angle between the cutout surface and the one of the axial end faces of the rotor core is 90 degrees, and a corner at which the cutout surface and the outer peripheral surface intersect is not more axially outward than either of the axial end faces of the stator core, and
   the stator coil includes coil ends projecting axially outward from the respective axial end faces of the stator core, and a separation distance between the cutout surface and a root end of one of the coil ends of the stator coil is set equal to or greater than a separation distance between the corner and the root end of the one of the coil ends of the stator coil, such that a density of magnetic flux flowing from the rotor core into the one of the coil ends becomes less than a magnetic flux density in slots of the stator core in which the stator coil are received.

2. The rotating electric machine of claim 1, wherein each of a plurality of conductor segments forming the stator coil is a rectangular wire comprising a conductor formed of a conductive metal material having a rectangular cross section and an insulative coating covering a peripheral surface of the conductor.

3. The rotating electric machine of claim 1, wherein a shaft of the rotating electric machine is connected to a wheel axis via gears of a gearbox, and a gear ratio between the shaft of the rotating electric machine and an input shaft for an engine connected to the wheel axis via the gears of the gearbox is greater than one.

4. The rotating electric machine of claim 1, wherein the cutout surface is a concave surface that is convex toward a center axis of the rotor core in axial cross-sectional profile so as to be curved in a circular arc.

5. A rotating electric machine comprising:
   a stator including a stator core and a stator coil wound around the stator core; and
   a rotor including a rotor core arranged coaxially and radially in a face-to-face relationship with the stator core and a permanent magnet imbedded in the rotor core, both axial end portions of the rotor core projecting more axially outward than respective axial end faces of the stator core,
   wherein the rotor core has a cutout surface between one of axial end faces of the rotor core and an outer peripheral surface of the rotor core, an intersection angle between the cutout surface and the one of the axial end faces of the rotor core is 90 degrees, and a corner at which the cutout surface and the outer peripheral surface intersect is not more axially outward than either of the axial end faces of the stator core, and
   the stator coil includes coil ends projecting axially outward from the respective axial end faces of the stator core, and a separation distance between the cutout surface and a root end of one of the coil ends of the stator coil is set equal to or greater than a separation distance between the corner and the root end of the one of the coil ends of the stator coil, such that a density of magnetic flux flowing from the rotor core into the one of the coil ends becomes less than a magnetic flux density in slots of the stator core in which the stator coil are received.

6. The rotating electric machine of claim 1, wherein the density of magnetic flux flowing from the rotor core into the one of the coil ends measured at the separation distance between the corner and the root end of the one of the coil ends of the stator coil is as low as the magnetic flux density in each of the slots.

7. The rotating electric machine of claim 5, wherein the density of magnetic flux flowing from the rotor core into the one of the coil ends measured at the separation distance between the corner and the root end of the one of the coil ends of the stator coil is as low as the magnetic flux density in each of the slots.

8. The rotating electric machine of claim 1, wherein the outer peripheral surface of the rotor core includes a tapered portion between the corner and a remaining portion of the outer peripheral surface, the remaining portion of the outer peripheral surface extending in an axial direction of the rotating electric machine.

9. The rotating electric machine of claim 5, wherein the outer peripheral surface of the rotor core includes a tapered portion between the corner and a remaining portion of the outer peripheral surface, the remaining portion of the outer peripheral surface extending in an axial direction of the rotating electric machine.

* * * * *